(12) United States Patent
Dabak et al.

(10) Patent No.: US 10,489,185 B2
(45) Date of Patent: *Nov. 26, 2019

(54) HYPERVISOR-ASSISTED APPROACH FOR LOCATING OPERATING SYSTEM DATA STRUCTURES BASED ON ATTRIBUTE MATCHING

(71) Applicant: NICIRA, INC., Palo Alto, CA (US)

(72) Inventors: Prasad Dabak, Pune (IN); Goresh Musalay, Pune (IN)

(73) Assignee: NICIRA, INC., Palo Alto, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/616,951

(22) Filed: Jun. 8, 2017

(65) Prior Publication Data

US 2018/0267819 A1 Sep. 20, 2018

(30) Foreign Application Priority Data

Mar. 17, 2017 (IN) .............................. 201741009269

(51) Int. Cl.
*G06F 12/1009* (2016.01)
*G06F 9/455* (2018.01)

(52) U.S. Cl.
CPC ...... *G06F 9/45558* (2013.01); *G06F 12/1009* (2013.01); *G06F 9/45545* (2013.01); *G06F 2009/45583* (2013.01); *G06F 2212/151* (2013.01); *G06F 2212/152* (2013.01); *G06F 2212/154* (2013.01)

(58) Field of Classification Search
CPC ............................................ G06F 2009/45583
See application file for complete search history.

(56) References Cited

U.S. PATENT DOCUMENTS

| 5,438,670 A * | 8/1995 | Baror .................... G06F 9/3802 711/169 |
| 7,213,125 B2 * | 5/2007 | de Dinechi ......... G06F 12/1036 711/147 |

(Continued)

OTHER PUBLICATIONS

Dewan, Prashant, et al. "A hypervisor-based system for protecting software runtime memory and persistent storage." Proceedings of the 2008 Spring simulation multiconference. Society for Computer Simulation International, 2008. (Year: 2008).*

(Continued)

*Primary Examiner* — Matthew J Brophy
(74) *Attorney, Agent, or Firm* — Su IP Consulting (57) ABSTRACT

Example methods are provided for locating an operating system (OS) data structure on a host according to a hypervisor-assisted approach. The method may comprise a virtualized computing instance identifying a guest virtual memory address range in which the OS data structure is stored; and configuring the hypervisor to perform a safe read on the guest virtual memory address range to access data stored within the guest virtual memory address range. The method may further comprise the virtualized computing instance performing attribute matching by comparing the data stored within the guest virtual memory address range with attribute data associated with the OS data structure; and determining a location associated with the OS data structure based on the attribute matching.

18 Claims, 9 Drawing Sheets

(56) References Cited

U.S. PATENT DOCUMENTS

| | | | | |
|---|---|---|---|---|
| 7,685,638 B1* | 3/2010 | Buches | G06F 21/53 | 726/22 |
| 8,271,450 B2* | 9/2012 | Horovitz | G06F 11/301 | 707/661 |
| 8,341,627 B2* | 12/2012 | Mohinder | G06F 12/145 | 718/1 |
| 8,397,242 B1* | 3/2013 | Conover | G06F 8/52 | 718/1 |
| 8,521,966 B2* | 8/2013 | Wibling | G06F 9/5016 | 711/147 |
| 8,875,295 B2* | 10/2014 | Lutas | G06F 12/109 | 726/24 |
| 9,021,476 B1* | 4/2015 | Pratt | G06F 9/45558 | 718/1 |
| 9,536,088 B1 | 1/2017 | Igotti | G06F 21/53 | |
| 9,639,698 B2 | 5/2017 | Yudin | G06F 21/53 | |
| 9,870,248 B2* | 1/2018 | Tsirkin | G06F 9/45558 | |
| 9,875,047 B2* | 1/2018 | Tsirkin | G06F 3/0622 | |
| 10,057,069 B2* | 8/2018 | Bonzini | H04L 9/3247 | |
| 10,078,526 B2* | 9/2018 | Han | G06F 9/45558 | |
| 10,078,527 B2* | 9/2018 | Han | G06F 9/45558 | |
| 10,083,129 B2* | 9/2018 | Tsirkin | G06F 12/1408 | |
| 10,114,958 B2* | 10/2018 | Sell | G06F 9/45558 | |
| 2004/0168070 A1* | 8/2004 | Szor | G06F 21/564 | 713/188 |
| 2006/0026385 A1* | 2/2006 | Dinechin | G06F 12/1036 | 711/210 |
| 2009/0144510 A1* | 6/2009 | Wibling | G06F 9/5016 | 711/147 |
| 2009/0327688 A1* | 12/2009 | Li | G06F 21/554 | 713/100 |
| 2011/0047543 A1* | 2/2011 | Mohinder | G06F 12/145 | 718/1 |
| 2011/0082962 A1* | 4/2011 | Horovitz | G06F 11/301 | 711/6 |
| 2012/0246723 A1* | 9/2012 | Lee | G06F 8/65 | 726/22 |
| 2012/0255017 A1* | 10/2012 | Sallam | G06F 21/575 | 726/24 |
| 2013/0091568 A1* | 4/2013 | Sharif | G06F 21/50 | 726/22 |
| 2014/0245444 A1* | 8/2014 | Lutas | G06F 12/109 | 726/24 |
| 2015/0026807 A1* | 1/2015 | Lutas | G06F 12/1009 | 726/23 |
| 2016/0210456 A1* | 7/2016 | Yudin | G06F 21/53 | |
| 2016/0216985 A1* | 7/2016 | Tsirkin | G06F 9/45558 | |
| 2016/0350018 A1* | 12/2016 | Tsirkin | G06F 3/0622 | |
| 2016/0371496 A1* | 12/2016 | Sell | G06F 9/45558 | |
| 2017/0046185 A1* | 2/2017 | Tsirkin | G06F 9/45558 | |
| 2017/0123832 A1* | 5/2017 | Han | G06F 9/45558 | |
| 2017/0126431 A1* | 5/2017 | Han | G06F 9/45558 | |
| 2017/0126559 A1* | 5/2017 | Han | G06F 9/45558 | |
| 2017/0126726 A1* | 5/2017 | Han | G06F 9/45558 | |
| 2017/0132412 A1* | 5/2017 | Igotti | G06F 21/53 | |
| 2017/0161204 A1* | 6/2017 | Roberts | G06F 9/45558 | |
| 2017/0250817 A1* | 8/2017 | Bonzini | H04L 9/3247 | |
| 2017/0286151 A1* | 10/2017 | Landers | G06F 9/45558 | |
| 2018/0024944 A1* | 1/2018 | Zeng | G06F 12/1009 | |
| 2018/0060249 A1* | 3/2018 | Tsirkin | G06F 12/1408 | |
| 2018/0232315 A1* | 8/2018 | Wibling | G06F 9/5016 | |
| 2018/0267818 A1* | 9/2018 | Dabak | G06F 9/45558 | |
| 2018/0267819 A1* | 9/2018 | Dabak | G06F 9/45558 | |

OTHER PUBLICATIONS

Hofmann, Owen S., et al. "Inktag: Secure applications on an untrusted operating system." ACM SIGPLAN Notices. vol. 48. No. 4. ACM, 2013. (Year: 2013).*

* cited by examiner

HYPERVISOR-ASSISTED APPROACH FOR LOCATING OPERATING SYSTEM DATA STRUCTURES BASED ON ATTRIBUTE MATCHING

RELATED APPLICATIONS

Benefit is claimed under 35 U.S.C. 119(a)-(d) to Foreign Application Serial No. 201741009269 filed in India entitled "HYPERVISOR-ASSISTED APPROACH FOR LOCATING OPERATING SYSTEM DATA STRUCTURES BASED ON ATTRIBUTE MATCHING", on Mar. 17, 2017, by NICIRA, INC. which is herein incorporated in its entirety by reference for all purposes The present application Ser. No. 15/616,951 is related in subject matter to U.S. patent application Ser. No. 15/616,935, which is incorporated herein by reference

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC), etc. For example, through server virtualization, virtual machines running different operating systems may be supported by the same physical host. Each virtual machine is generally provisioned with virtual resources to run a guest operating system (OS) and applications. The virtual resources may include central processing unit (CPU) resources, memory resources, storage resources, network resources, etc. In practice, it may be desirable to access some OS data structures for various reasons, for example as a security feature on the guest OS to protect the associated virtual machine against malware. However, the location some OS data structures may be unknown to the virtual machine.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to locating operating system (OS) data structures will now be explained in more detail using FIG. 1, which is a schematic diagram illustrating example virtualized computing environment 100 in which a hypervisor-assisted approach for locating OS data structures may be performed. It should be understood that, depending on the desired implementation, virtualized computing environment 100 may include additional and/or alternative components than that shown in FIG. 1.

Figure 1:
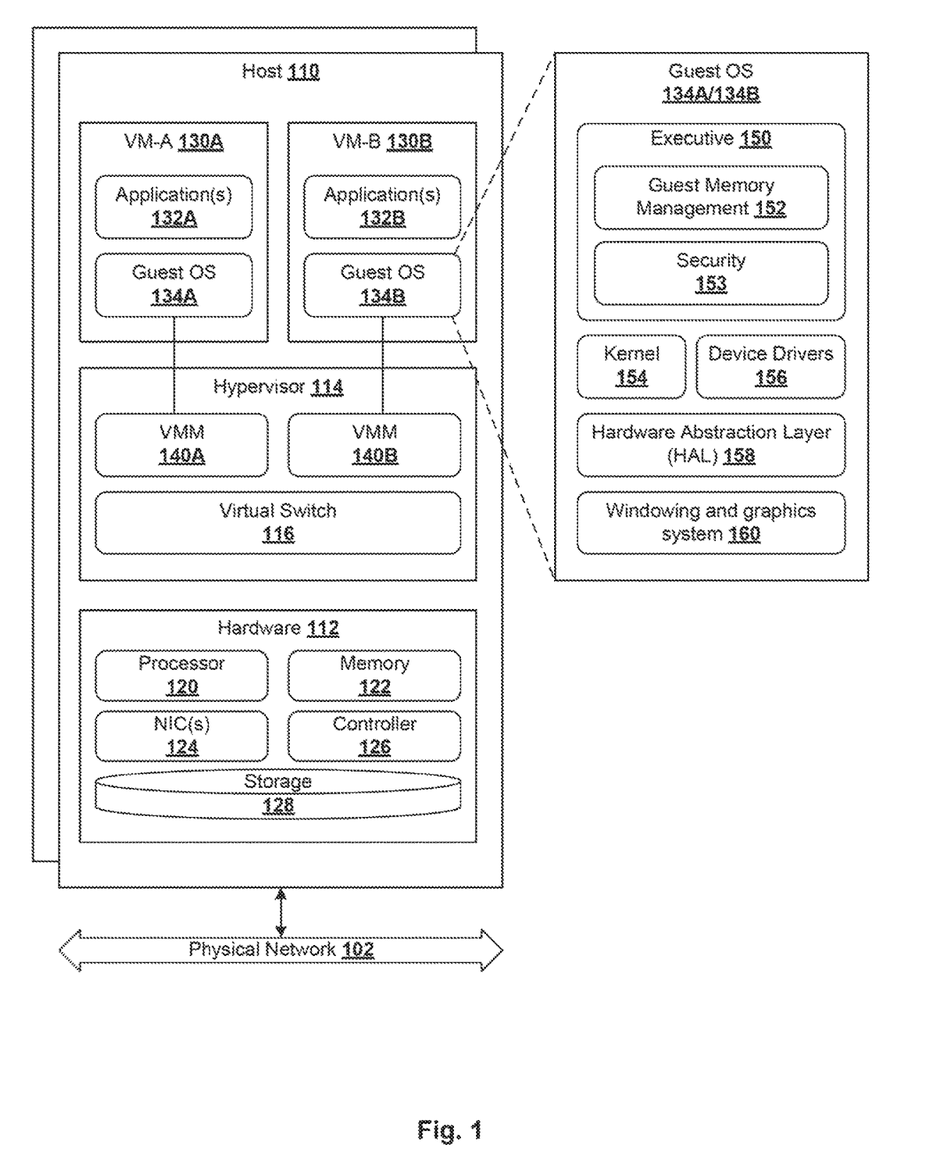
FIG. 1 is a schematic diagram illustrating an example virtualized computing environment in which a hypervisor-assisted approach for locating an operating system (OS) data structures may be performed.

In the example in FIG. 1, virtualized computing environment 100 includes multiple hosts 110 (also known as "computing devices", "host computers", "host devices", "physical servers", "server systems", etc.) connected via physical network 102. Each host 110 includes hardware 112 and hypervisor 114 to support multiple guest virtual machines, such as VM-A 130A and VM-B 130B. Throughout the present disclosure, the term "hypervisor" may refer to any suitable computer hardware virtualization software that enables multiple virtual machines to execute simultaneously on a single host, such as VMware ESX® (available from VMware, Inc.). In practice, each host 110 may support tens or hundreds of virtual machines (two shown for simplicity in FIG. 1). The term "hypervisor" also includes system-level software that supports namespace containers such as Docker, etc.

Hypervisor 114 maintains a mapping between underlying hardware 112 and virtual resources allocated to virtual machines 130A, 130B. For example, hardware 112 includes processor(s) 120, physical memory 122 (e.g., random access memory (RAM)), physical network interface controller(s) or NIC(s) 124 to provide access to physical network 102, and storage disk(s) 128 (e.g., solid state drive, hard disk drive) accessible via storage controller 126, etc. In practice, hypervisor 114 may also be a "type 2" or hosted hypervisor that runs on top of a conventional operating system on host 110. Hypervisor 114 also implements virtual switch 116 to handle egress packets forwarding from, and ingress (i.e., incoming) packets to, virtual machines 130A, 130B.

Although examples of the present disclosure refer to virtual machines, it should be understood that a "virtual machine" is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

VM-A 130A and VM-B 130B each represent a software implementation of a physical machine. Virtual resources are allocated to virtual machine 130A/130B to support guest OS 134A/134B, and application(s) 132A/132B, etc. Corresponding to hardware 112, the virtual resources may include virtual CPU, virtual memory, virtual disk, virtual network interface controller (vNIC), etc. Hardware resources may be emulated using virtual machine monitor (VMM) 140A/140B implemented by hypervisor 114. In practice, VMM 140A/140B may be considered as part of virtual machine 130A/130B, or alternatively, separated from the virtual machine.

Guest OS 134A/134B may be implemented using any suitable operating system, such as Microsoft Windows (trademark of Microsoft Corporation), Linux (trademark of Linux Mark Institute), etc. Using Microsoft Windows (e.g., Windows NT) as an example, guest OS 134A/134B may include various kernel-mode components, such as executive 150, kernel 154, device drivers 156, hardware abstraction layer (HAL) 158, and windowing and graphics system 160. In more detail, executive 150 provides base OS services, such as guest memory management 152, security 153, process and thread management, input/output (I/O), networking, and inter-process communication. Kernel 154 provides low-level OS functions, such as thread scheduling, interrupt and exception dispatching, and multiprocessor synchronization.

Device drivers 156 include both hardware device drivers that translate user I/O function calls into specific hardware device I/O requests, as well as non-hardware device drivers such as file system and network drivers. HAL 158 is a layer of code that isolates kernel, device drivers and the rest of guest OS from platform-specific hardware differences. Windowing and graphics system implements the graphical user interface (GUI) functions, such as for interface controls, drawing, etc. In practice, the core components of guest OS 134A/134B are usually stored in system files. For example, kernel image NTOSKRNL.EXE is used to implement executive 150 and kernel 145 layers of guest OS 134A/134B, HAL.DLL to implement HAL 158, Win32k.sys to implement a kernel-mode part of the Windows subsystem, etc.

To facilitate memory management, existing operating systems introduce a layer of abstraction between memory addresses used by applications, and memory addresses associated with the physical memory. When an application requests memory, the operating system will allocate memory in a virtual memory address space and map it to a physical memory address space. A page table is used to store mapping information between the address spaces. If an application attempts to access a virtual memory address that is not mapped to the physical memory address space, the operating system will detect a page fault.

In the context of hardware virtualization in FIG. 1, three levels of memory address space may be used. An example in shown in FIG. 2, which is a schematic diagram illustrating example address space mapping 200 implemented on host 110 in virtualized computing environment 100. At a first level, applications 132A/132B executing on virtual machine 130A/130B may access guest virtual memory address space 210A/210B. At a second level, guest virtual memory address space 210A/210B may be mapped to guest physical memory address space 220A/220B associated with virtual memory allocated to virtual machine 130A/130B by hypervisor 114. At a third level, guest physical memory address space 220A/220B may be mapped to host physical memory address space 230 of the underlying physical memory 122 (e.g., RAM) of host 110. It should be noted that guest physical memory address space 220A/220B is "physical" from the perspective of guest OS 134A/134B, but "virtual" from the perspective of hypervisor 114.

Mappings between the first level and second level are maintained by guest OS 134A/134B. For example in FIG. 2, at VM-A 130A, guest OS 134A maintains mappings between guest virtual memory address space=$VA_1$ to $VA_N$ (see 210A) to guest physical memory address space=$PA_1$ to $PA_N$ (see 220A). Similarly, at VM-B 130B, guest OS 134B maintains mappings between guest virtual memory address space=$VB_1$ to $VA_M$ (see 210B) to guest physical memory address space=$PB_1$ to $PB_M$ (see 220B). In practice, the size of guest virtual memory address space 210A/210B may be different from (e.g., larger) the size of the guest physical virtual memory address space 220A/220B.

Mappings between the second level and third level are maintained by hypervisor 114. For example in FIG. 2, guest physical memory address spaces 220A, 220B are both mapped to host physical memory address space=$HA_1$ to $HA_K$. By controlling the mappings, hypervisor 114 ensures that different VMs do not bump into one another in the underlying physical memory 122. At each level, the corresponding memory may be divided into chunks called "pages" (e.g., guest physical memory pages of size=4 KB per page). Memory mappings or translations may be implemented using page tables.

Figure 2:
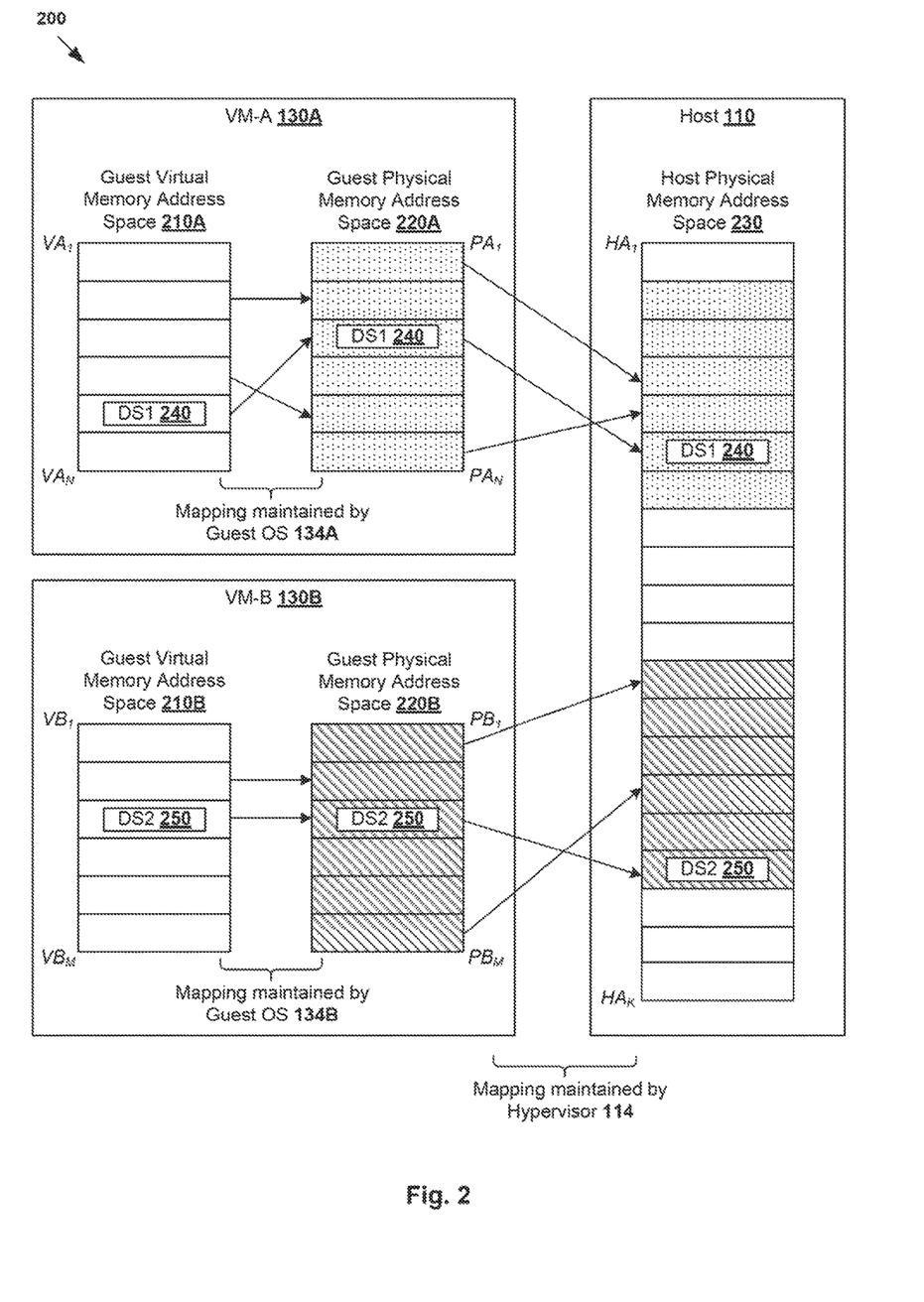
FIG. 2, which is a schematic diagram illustrating example address space mapping implemented on a host in a virtualized computing environment.

Using the example in FIG. 2, different memory addresses (e.g., guest virtual memory address, guest physical memory address, and host physical memory address) may refer to the same location in the underlying electronic storage. For example, an OS data structure (e.g., DS1 240 of VM-A 130A, DS2 250 of VM-B 130B) may be located using different addresses within respective guest virtual memory address space 210A/210B, guest physical memory address space 220A/220B and host physical memory address space 230.

It should be noted that, when used in the context of memory management, the term "virtual" in "guest virtual memory address space," "guest virtual memory address" and the like may refer generally to the technique of presenting an abstraction of the memory allocated to a virtual machine, and the physical memory of the host. The use of the term "virtual" in the context of memory management is distinguishable from the use of the same term in the context hardware virtualization, such as "virtual machine" representing a software implementation of a physical machine.

In practice, guest OS 134A/134B may be implement a security application (e.g., antivirus solution implemented as a kernel driver; not shown for simplicity) to protect virtual machine 130A/130B against harmful malicious software (i.e., malware) that may compromise the operations of virtual machine 130A/130B. Here, the term "malware" is used as an umbrella term to cover various forms of hostile or intrusive software, such as viruses, worms, Trojan horse programs, spyware, phishing, adware, riskware, rookits, spams, scareware, ransomware, a combination thereof, etc. To implement the security application, it may be necessary to locate critical OS data structures to, for example, monitor for any suspicious activity on those OS data structures.

However, in some cases, these data structures are internal, hidden, undocumented or unexposed, which means that their location is unknown and cannot be determined using application programming interface (API) supported by guest OS 134A/134B. For example, kernel image NTOSKRNL.EXE may include various important OS data structures that are not directly accessible using API. Also, the OS data structures may change from one OS version to another, and/or following upgrades using service packs, hotfixes, etc. As such, it is quite challenging to locate these OS data structures.

Hypervisor-Assisted Approach

According to examples of the present disclosure, a hypervisor-assisted approach may be used to locate OS data structures, such as DS1 240 associated with VM-A 130A and DS2 250 associated with VM-B 130B in the example in FIG. 2. In practice, hypervisor 114 has the highest privilege level on host 110, followed by guest OS 134A/134B, and applications 132A/132B (i.e., least privileged). The different privilege levels serve to protect host 110 from the instability caused by particular virtual machine 130A/130B due to misbehaving application 132A/132B, corrupt guest OS 134A/134B, etc.

To locate an OS data structure, VM 130A/130B (e.g., more particularly guest OS 134A/134B) may take advantage of the capabilities or primitives of hypervisor 114 that are not available at guest OS 134A/134B. For example, guest OS 134A/134B may use a trace capability of hypervisor 114 to generate notification data. Alternatively or additionally, guest OS 134A/134B may use safe read capability of hypervisor 114 such that page faults of violations generated while accessing guest virtual memory address space 210A/210B will be absorbed by hypervisor 114 and not passed onto, guest OS 134A/134B. Hypervisor 114 stops reading when it encounters any fault, and returns the number of byte read to guest OS 134A/134B. This helps guest OS 134A/134B to peek into an arbitrary guest virtual memory address range without exposing itself to crashes caused by the page faults or violations. Two examples will be described below.

In a first example, a notification approach may be used to locate an OS data structure. The notification approach may involve using hypervisor 114 to generate notification data associated with a guest virtual memory address range in which the OS data structure is stored. Notification data that is generated in response to a manipulation of the OS data may be analyzed to determine a location of the OS data structure. Various examples will be explained further using FIG. 3, FIG. 4 and FIG. 5.

In a second example, an attribute matching approach may be used to locate an OS data structure. The attribute matching approach may involve using hypervisor 114 to perform a safe read on a range within guest virtual memory address space 210A/210B to access data stored within the range. This facilitates an attribute matching process to compare the data with attribute data of the OS data structure to determine its location. Various examples will be explained further using FIG. 6, FIG. 7 and FIG. 8.

Once a particular OS data structure is located, a security application implemented by guest OS 134A/134B may monitor the OS data structure for any undesirable tampering or security attack. Any suitable OS data structures may be located, such as service descriptor tables, data structure storing callback pointers (e.g., static array of pointers), substructure within a data structure (e.g., an object within a processor-related data structure), etc. Examples of the present disclosure may be used to locate OS data structures that are require security protection because, inter alia, they are critical to the operations of guest OS 134A/134B.

First Hypervisor-Assisted Approach Based on Notification Data

Figure 3:
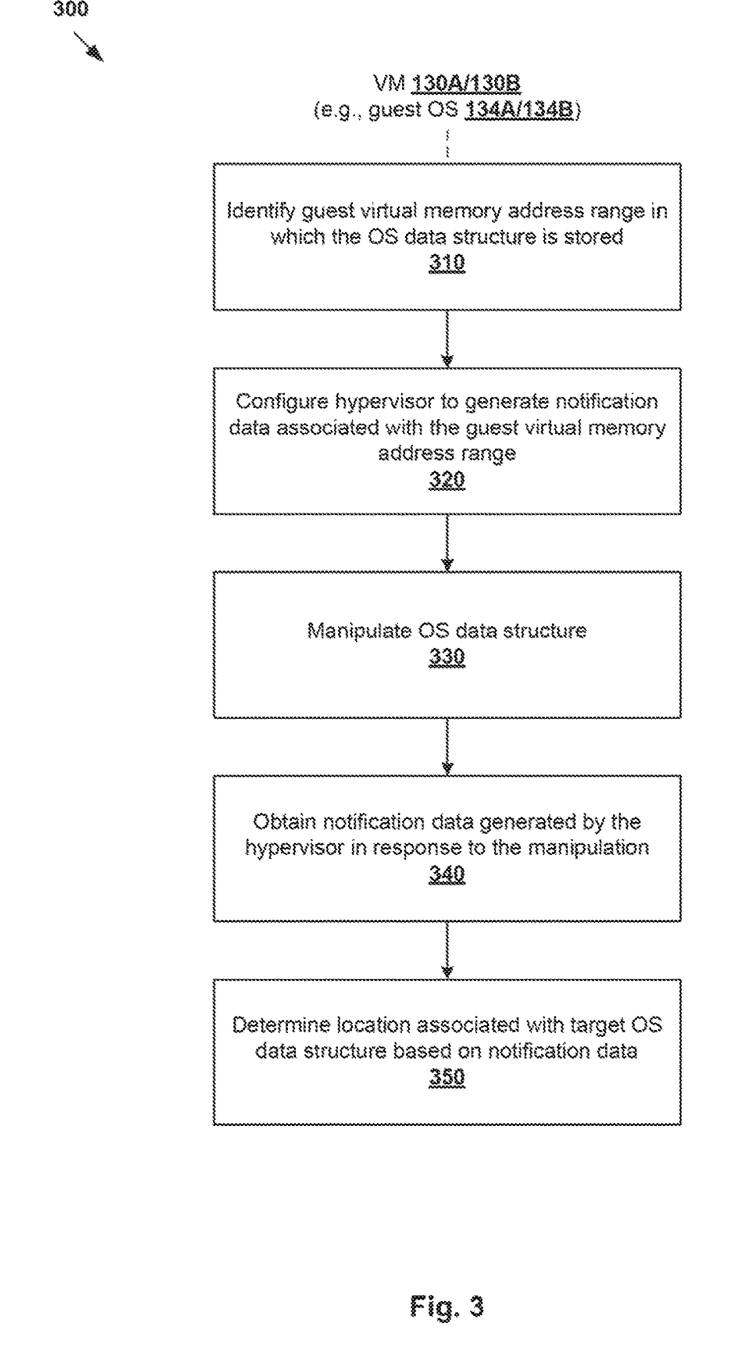
FIG. 3 is a flowchart of an example process to locate an OS data structure on a host according to a first hypervisor-assisted approach.

FIG. 3 is a flowchart of example process 300 to locate an OS data structure on host 110 according to a first hypervisor-assisted approach. Example process 300 may include one or more operations, functions, or actions illustrated by one or more blocks, such as 310 to 350. The various blocks may be combined into fewer blocks, divided into additional blocks, and/or eliminated depending on the desired implementation. In practice, example process 300 may be implemented by any suitable virtualized computing instance, such as VM-A 130A using guest OS 134A.

At 310 in FIG. 3, guest OS 134A identifies a guest virtual memory address range in which the OS data structure is stored. Using VM-A 130A as an example, the guest virtual memory address range represents a potential address range of the OS data structure within guest virtual memory address space 210A.

At 320 in FIG. 3, guest OS 134A configures hypervisor 114 to generate notification data associated with the guest virtual memory address range. Depending on the desired implementation, hypervisor 114 may be configured to generate the notification data at a page level such that the notification data is associated with guest physical memory page(s) mapped to the guest virtual memory address range. Any other suitable granularity may be used, such as byte-level, etc.

In one example, hypervisor 114 may be configured to perform a safe read on the guest virtual memory address range to access data stored on guest physical memory page(s) mapped to the guest virtual memory address range. In practice, safe read may be implemented by registering, with hypervisor 114, an instruction pointer to a memory copy function to cause hypervisor 114 to absorb any fault that arises from accessing data stored within the guest virtual memory address range using the memory copy function. Safe read will be described in more detail using FIG. 6, FIG. 7 and FIG. 8.

At 330 in FIG. 3, guest OS 134A manipulates the OS data structure. For example, this may involve invoking an API to perform an operation on the OS data structure. The term "manipulate" or its derivatives may include, but not limited to, modifying the OS data structure to add new data or element(s), modifying the OS data structure to update or remove existing data or element(s), removing the OS data structure, performing a write, read or execute operation associated with the OS data structure, etc.

At 340 and 350 in FIG. 3, guest OS 134A obtains notification data generated by hypervisor 114 in response to the manipulation, and determines a location associated with the OS data structure based on the notification data. Throughout the present disclosure, the term "notification data" may refer to any suitable data (also known as traces or trace data) generated by hypervisor 114 when data stored within the guest virtual memory address range is manipulated. Any suitable approach may be used to configure hypervisor 114 to generate the notification data, such as by configuring a write trace that is triggered by a write operation in the examples in FIG. 4 and FIG. 5. Depending on the desired implementation, the notification data may be generated using other approaches, such as read trace that is triggered by a read operation, execute trace that is triggered by an execute operation, etc.

In practice, it is generally very challenging to modify guest OS 134A to generate the notification data. This is because the implementation of "write trace" involves marking the guest physical memory pages as read-only, and intercepting a guest page fault handler associated with the pages. Using Windows as an example, guest OS 134A may not be able to perform the interception due to kernel patch protection in a 64-bit system. Even in the event that the interception is allowed, guest page faults have to be filtered to identify relevant ones. Further, malicious rootkits running on guest OS 134A may affect these operations by marking a page as read/write. As such, configuring hypervisor 114 to generate the notification data provides better isolation and performance guarantee.

(a) First Example: Locating a Service Descriptor Table

Figure 4:
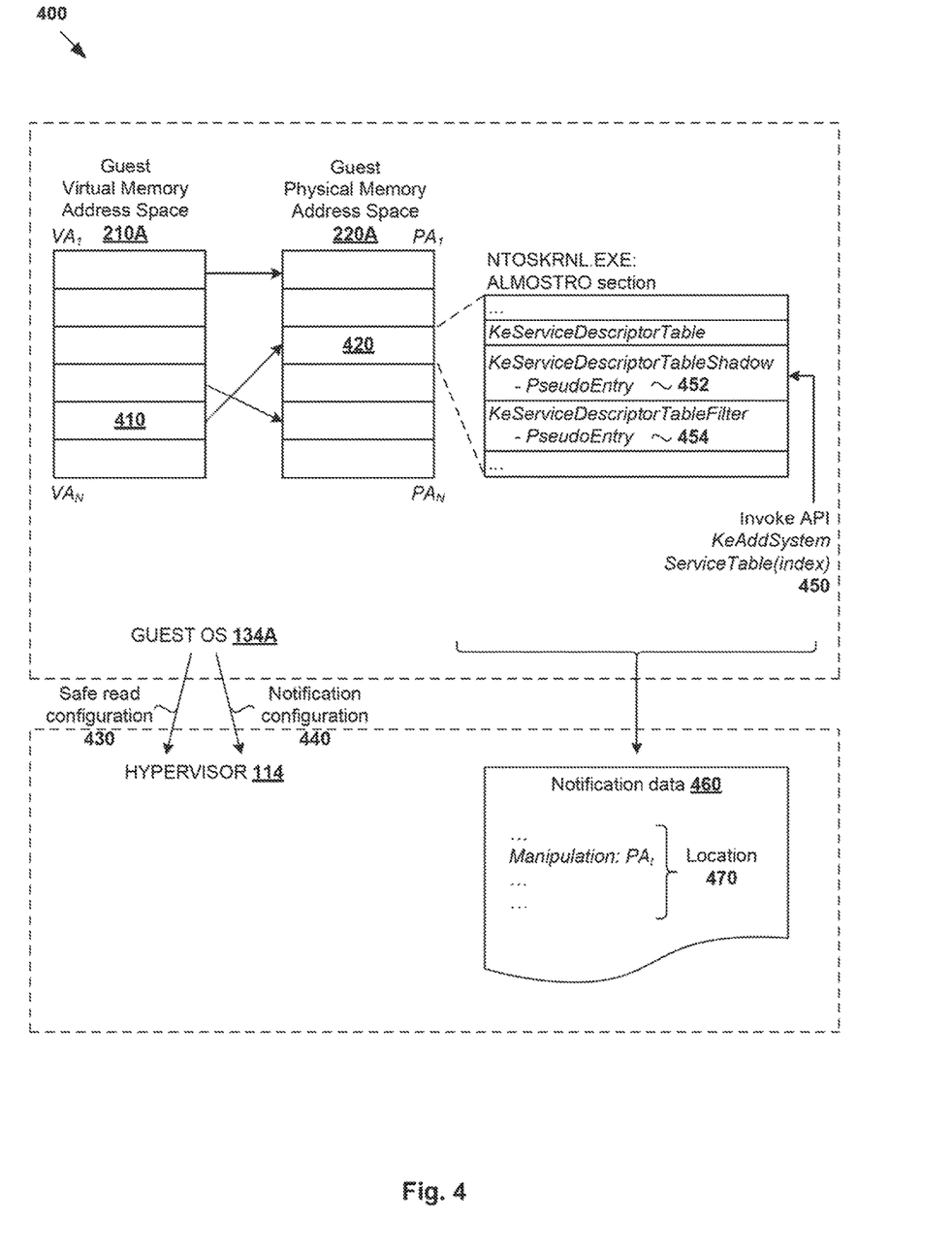
FIG. 4 is a schematic diagram illustrating an example implementation of the first hypervisor-assisted approach in FIG. 3 to locate a service descriptor table.

FIG. 4 is a schematic diagram illustrating example implementation 400 of the first hypervisor-assisted approach in FIG. 3 to locate a service descriptor table. In this example, the OS data structure may be a service descriptor table associated with guest OS 134A at VM-A 130. In general, a service descriptor table is an OS data structure that stores the base address of system service tables utilized by guest OS 134A. However, the service descriptor tables are generally not accessible using API supported by the operating system.

Using the notification approach, at 414 in FIG. 4, guest OS 134A identifies a guest virtual memory address range (hereinafter "target address range") in which the target service descriptor table is stored within a guest virtual memory address space 210A. For example in FIG. 4, KeServiceDescriptorTableShadow is a service descriptor table that resides within an ALMOSTRO section of NTOSKRNL.EXE. As described using FIG. 1, NTOSKRNL.EXE is a kernel image in the form of a portable executable that implements executive 150 and kernel 154 layers of guest OS 134A.

To identify the target address range, guest OS 134A may perform in-memory parsing of NTOSKRNL.EXE. For example, at run time, NTOSKRNL.EXE may be mapped into the guest virtual memory address space, such as 0xfffff803ab20d000 to 0xfffff803aba2d000 for a 64-bit Windows 10 system, and 0x81a0d000 to 0x82037000 for a 32-bit system. NTOSKRNL.EXE also stores related data structures, such as KeServiceDescriptorTable and KeServiceDescriptorTableFilter, etc.

At 420 in FIG. 4, guest OS 134A accesses data stored on the guest physical memory pages associated with the target address range. As shown at 430 in FIG. 3, this may involve configuring hypervisor 114 to perform a safe read on the target address range (e.g., using a safe read request). This takes advantage of the safe read capability of hypervisor 114 to ensure that the target address range is valid, and any page faults or violations encountered by hypervisor 114 will not be passed onto guest OS 134A. The guest physical memory pages may also be locked to ensure that they are not swapped out, and the mapping from the target address range within guest virtual memory address space 210A to guest physical memory address space 220A remains intact while KeServiceDescriptorTableShadow is being located.

At 440 in FIG. 4, guest OS 134A configures hypervisor 114 to generate notification data at a page level, such as at the granularity of the guest physical memory pages. Any suitable approach may be used for the configuration. For example, guest OS 134A may communicate a "write trace" command to hypervisor 114 via a backdoor call that identifies the page address of each guest physical memory page. In practice, there are different types of traces, such as read trace, write trace, and execute trace, etc. "Write" traces are typically implemented by hypervisor 114 by manipulating nested/extended page table entries (NPT/EPT). To generate the notification data, hypervisor 114 may mark the page permission as "read-only" such that any write operation triggers a fault that is delivered as a write trace before the write operation is allowed to proceed.

At 450 in FIG. 4, OS data structure=KeServiceDescriptorTableShadow is manipulated, such as by invoking an API associated with the service descriptor table. For example, a pseudo entry (see 452) may be added to the service descriptor table by invoking API KeAddSystemServiceTable(index), where index=2 represents KeServiceDescriptorTableShadow. (Note that index=1 for KeServiceDescriptorTable and index=3 for KeServiceDescriptorTableFilter.)

In more detail, KeServiceDescriptorTable, KeServiceDescriptorTableShadow, KeServiceDescriptorTableFilter each have two entries. The first entry in each table points to a system call table corresponding to NTOSKRNL.EXE. The win32 subsystem loads late in a boot sequence and invokes the KeAddSystemServiceTable API to add a second entry in KeServiceDescriptorTableShadow and KeServiceDescriptorTableFilter. The second entry in KeServiceDescriptorTable is unused. As such, in one example, pseudo entry 452 may be added before the win32 subsystem is loaded.

At 460 in FIG. 4, guest OS 134A retrieves notification data generated by hypervisor 114 in response to the above manipulation. For example, the notification data may be retrieved by accessing a known location that stores notification data, sending a "get trace" request to hypervisor 114, etc.

At 470 in FIG. 4, guest OS 134A analyses the notification data to locate the OS data structure within the guest physical memory pages (see 420) mapped to the target address range (see 410). In the example in FIG. 4, the target address range (e.g., 0x1000 to 0x5000) may be mapped to four guest physical memory pages, say "P1," "P2," "P3" and "P4" (not shown in detail for simplicity). Each of these pages may be 4 KB each, one or more of them storing KeServiceDescriptorTableShadow. An opaque 16-bit value is provided by a security application at guest OA 134A to hypervisor 114 when the latter is configured to generate the notification data. When a page is modified, hypervisor 114 returns the opaque value as part of the notification data. The value may be used to associate the notification data to internal state data maintained by guest OS 134A (e.g., using a security application).

Based on the notification data, guest OS 134A may identify an offset on a particular page (e.g.; page "P2" at offset=0x10) that has been affected (e.g., modified by the invocation of KeAddSystemServiceTable(index). In this case, a guest physical memory address (e.g., $PA_t$) associated with offset=0x10 on page "P2" may be identified, and mapped to a guest virtual memory address (e.g., $VA_t$=0x2010) within the target address range. As such, KeServiceDescriptorTableShadow is located at location=guest virtual memory address.

After KeServiceDescriptorTableShadow is located, guest OS 134A may remove the pseudo entries added to KeServiceDescriptorTableShadow. In practice, KeServiceDescriptorTableFilter may also be located in a similar manner, such as by invoking KeAddSystemServiceTable(index=3) to add a pseudo entry (see 454) to KeServiceDescriptorTableFilter.

(b) Second Example: Locating an OS Data Structure of Callback Pointers

In a second example of the notification approach, the target OS data structure may be a data structure storing callback pointers. For example, Windows exports PsSetCreateProcessNotifyRoutineEx( ) API to register a callback function that notifies the caller when a process is started or stopped (e.g., to intercept process creation events). Windows maintains a global array (e.g., static array) of 64 pointers to respective instances of EX_CALLBACK_ROUTINE_BLOCK. When one registers a callback function, a new EX_CALLBACK_ROUTINE_BLOCK object is allocated, and a pointer to the new object is stored in one of the available slots in the global array.

Once allocated, one field of EX_CALLBACK_ROUTINE_BLOCK is used to store a callback function pointer to the newly registered callback function. In general, a callback function pointer stores the memory address of a function such that the function can be called through that pointer. Callback function pointers may be used as parameters to other function calls, which provide more flexibility to software developers with the way software applications are constructed. A popular technique used by malware is to change the values of the callback function pointer to point to malicious code, an action known as hooking. This way, the malware can hijack the control flow of an OS. It is therefore useful to locate or discover the global array, which is usually hidden, as well as to protect it either using tracing, periodic reconciliation, etc.

Figure 5:
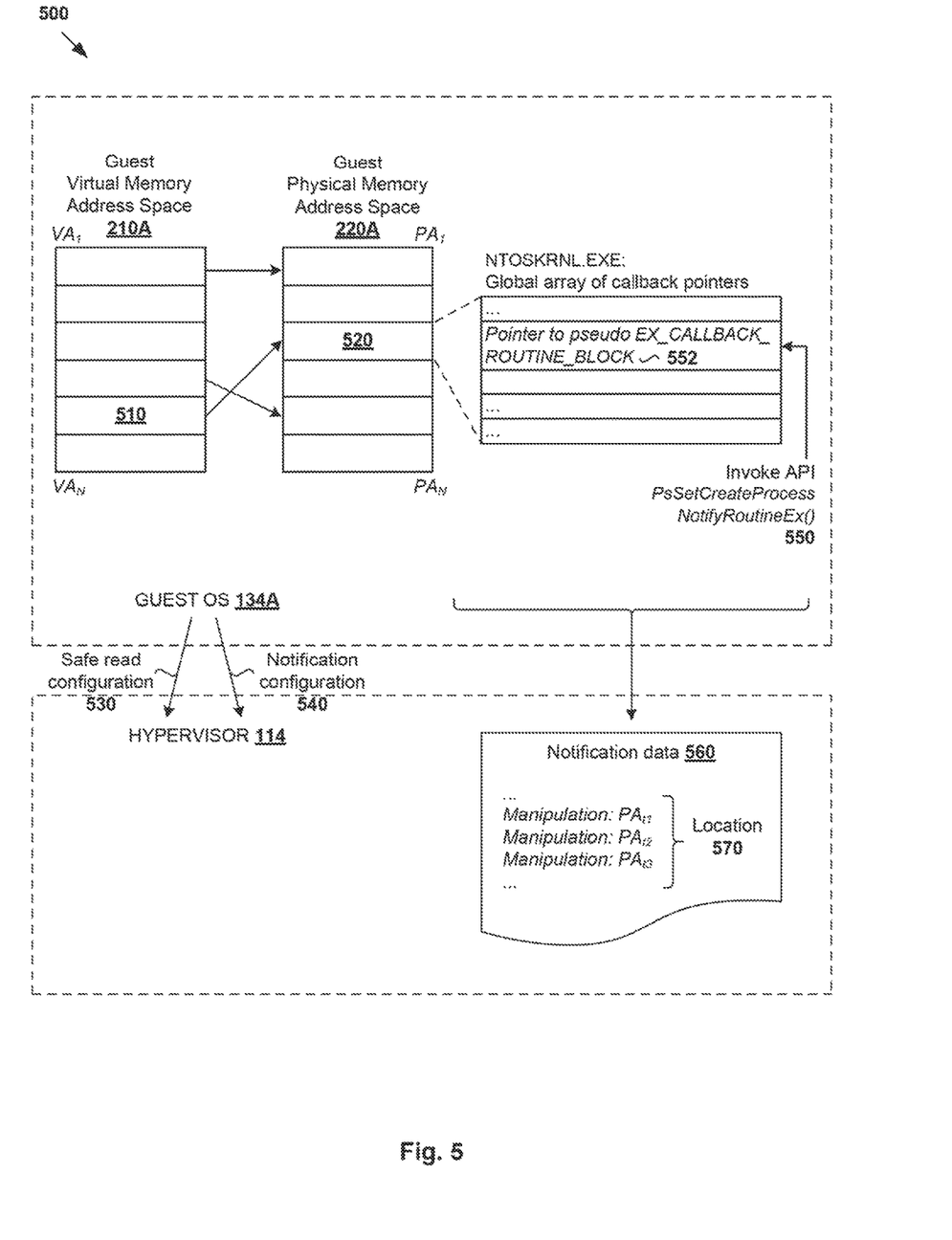
FIG. 5 is a schematic diagram illustrating an example implementation of the first hypervisor-assisted approach in FIG. 3 to locate an OS data structure that store callback pointers.

In more detail, FIG. 5 is a schematic diagram illustrating example implementation 500 of the first hypervisor-assisted approach in FIG. 3 to locate an OS data structure that store callback pointers. At 510 in FIG. 5, guest OS 134A identifies a target address range associated with NTOSKRNL.EXE in which the global array is stored, such as within a data section of the kernel image. The target address range is within a guest virtual memory address space 210A (e.g., $VA_1$ to $VA_N$). Similar to the example in FIG. 4, the target address range may be identified by performing an in-memory parsing of NTOSKRNL.EXE.

At 520 in FIG. 5, guest OS 134A accesses data stored on the guest physical memory pages associated with the target address range. As shown at 530 in FIG. 5, this may involve configuring hypervisor 114 to perform a safe read on the target address range (e.g., using a safe read request). The guest physical memory pages may also be locked to ensure that they are not swapped out, and the mapping from the target address range remains intact while the OS data structure is being located.

At 540 in FIG. 5, guest OS 134A configures hypervisor 114 to generate notification data at a page level, i.e., at the granularity of the guest physical memory pages. Similar to the example in FIG. 4, guest OS 134A may communicate a "write trace" command to hypervisor 114 via a backdoor call that identifies the page address of each guest physical memory page.

At 550 in FIG. 5, PsSetCreateProcessNotifyRoutineEx( ) is invoked by guest OS 134A to register a pseudo callback function. The invocation causes the allocation of a new (pseudo) EX_CALLBACK_ROUTINE_BLOCK for the pseudo callback function. The global array is also modified accordingly (i.e., modification operation) to store a pointer to the pseudo EX_CALLBACK_ROUTINE_BLOCK (see 552 in FIG. 5). The invocation also causes hypervisor 114 to generate notification data.

At 560 in FIG. 5, guest OS 134A retrieves the notification data generated by hypervisor 114 in response to the above manipulation. Similar to the example in FIG. 4, the notification data may be retrieved by accessing a known location that stores notification data, sending a "get trace" request to hypervisor 114, etc.

At 570 in FIG. 5, guest OS 134A analyses the notification data to locate the global array within the guest physical memory pages (see 520) mapped to the target address range (see 510). In the example in FIG. 5, since the target address range encompasses a data section of NTOSKRNL.EXE, the notification data includes events that may be unrelated to the invocation of PsSetCreateProcessNotifyRoutineEx( ). For example, notification data may be generated in response to multiple manipulations associated with the target address range, such as at corresponding guest physical memory addresses $PA_{t1}$, $PA_{t2}$ and $PA_{t3}$. In this case, guest OS 134A may examine the value written at each of these addresses.

Each value read from a particular guest physical memory page may be treated as a potential pointer to the pseudo EX_CALLBACK_ROUTINE_BLOCK allocated for the pseudo callback function. For example, starting with address=$PA_{t1}$, guest OS 134A may request hypervisor 114 to perform a safe read on that address of size of (EX_CALLBACK_ROUTINE_BLOCK). If the safe read succeeds, guest OS 134A may check whether one of the fields in EX_CALLBACK_ROUTINE_BLOCK stores the pointer to the pseudo callback function. If yes, the OS data structure is located. Otherwise, this process is repeated for other potential addresses, i.e., $PA_{t2}$ and $PA_{t3}$.

The global array may also be located, such as by performing attribute matching for pointers in surrounding area (e.g., +/−64 pointers), etc. The location of the global array may be identified as an offset within a particular guest physical memory page. In this case, a guest physical memory address associated with the offset may be mapped to a guest virtual memory address within the target address range of NTOSKRNL.EXE. After the OS data structure is located, PsSetCreateProcessNotifyRoutineEx( ) may be invoked to remove the pseudo callback function and EX_CALLBACK_ROUTINE_BLOCK accordingly.

Second Hypervisor-Assisted Approach Based on Attribute Matching

Figure 6:
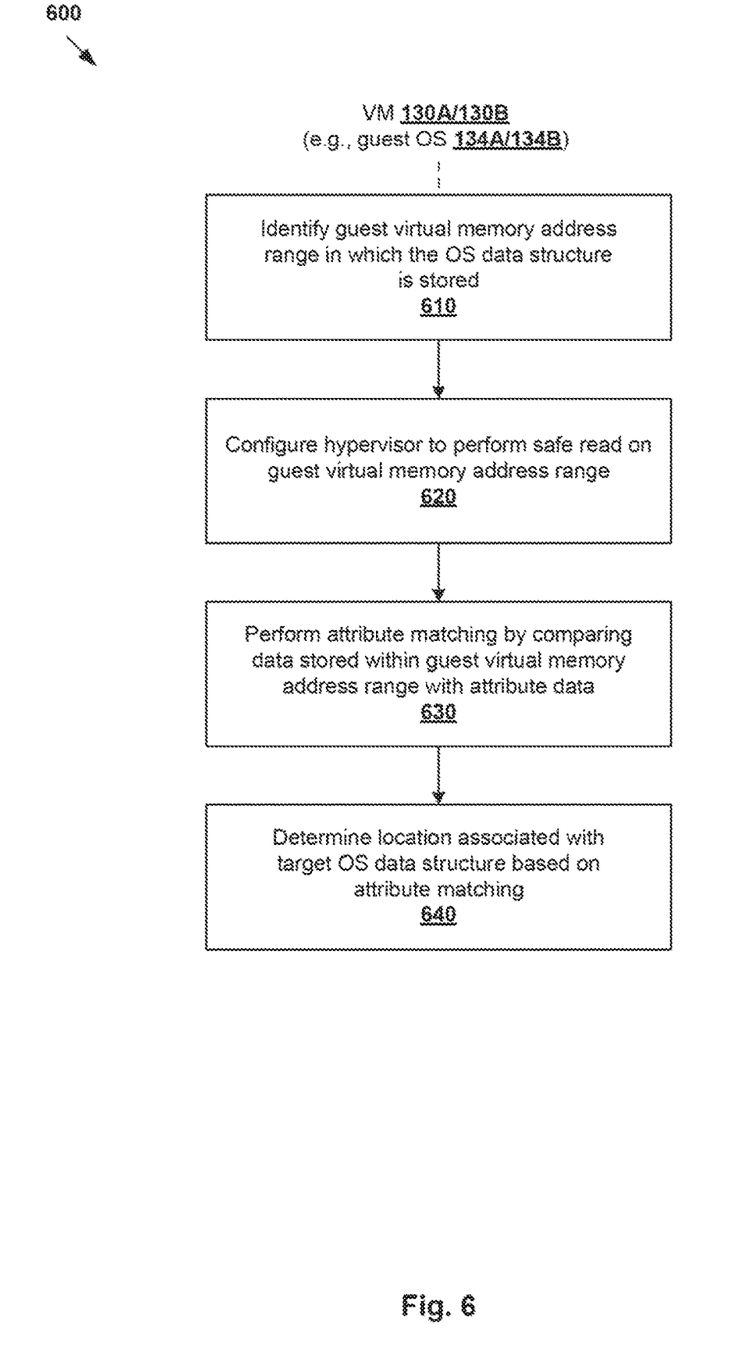
FIG. 6 is a flowchart of an example process to locate an OS data structure on a host according to a second hypervisor-assisted approach.

FIG. 6 is a flowchart of an example process to locate an OS data structure on a host according to a second hypervisor-assisted approach. Example process 600 may include one or more operations, functions, or actions illustrated by one or more blocks, such as 610 to 640. The various blocks may be combined into fewer blocks, divided into additional blocks, and/or eliminated depending on the desired implementation. In practice, example process 600 may be implemented by any suitable virtualized computing instance, such as by VM-B 130B using guest OS 134B.

At 610 in FIG. 6, guest OS 134B identifies a guest virtual memory address range in which the OS data structure is stored. At VM-B 130B for example, the guest virtual memory address range is within guest virtual memory address space 210B.

At 620 in FIG. 6, guest OS 134B configures hypervisor 114 to perform a safe read to access data stored within the guest virtual memory address range. For example, guest OS 134B may register, with hypervisor 114, an instruction pointer to a memory copy function to cause the hypervisor to absorb any fault that arises from accessing the data stored within the guest virtual memory address range using the memory copy function. The memory copy function may then be called to copy the data stored within the guest virtual memory address range from a source buffer to a destination buffer.

At 630 in FIG. 6, guest OS 134B performs attribute matching by comparing the accessed data with attribute data associated with the OS data structure.

As will be described further using FIG. 7 and FIG. 8, the attribute data may include one or more attributes: memory page offset data associated with at least one field of the OS data structure, a value (e.g., number within a predetermined range, pointer to an address within a predetermined address range) stored in at least one field of the OS data structure, data type (e.g., pointer, integer) associated with at least one field of the OS data structure. In this case, the attribute matching process may involve matching the data stored on a particular guest physical memory page with the attribute(s). Additionally or alternatively, the attribute data may specify a predetermined order of multiple attributes associated with the OS data structure. In this case, the attribute matching process may involve matching a series of data stored on a particular guest physical memory page with the respective multiple attributes according to the predetermined order.

At 640 in FIG. 6, guest OS 134B determines a location associated with the OS data structure based on the attribute matching. For example, based on the attribute matching, a more specific guest virtual memory address or address range that stores data matching with the attribute data may be identified. Some examples will be discussed below.

(a) First Example: Locating a Service Descriptor Table

In a first example, the service descriptor tables in FIG. 4 may be located without necessitating hypervisor 114 to generate notification data. Instead, KeServiceDescriptorTable, KeServiceDescriptorTableShadow and KeServiceDescriptorTableFilter may be located based on their attribute data.

Figure 7:
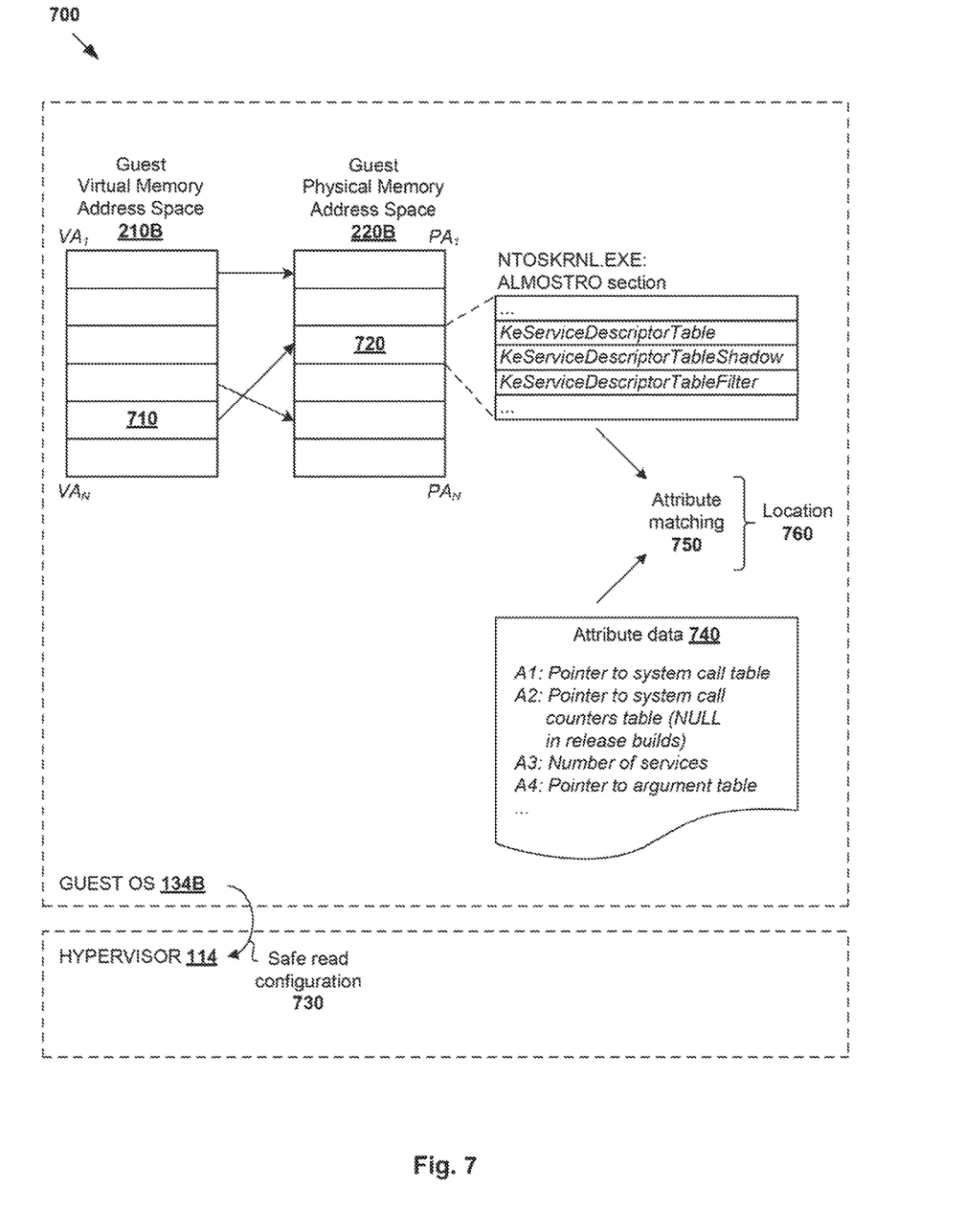
FIG. 7 is a schematic diagram illustrating an example implementation of the second hypervisor-assisted approach in FIG. 6 to locate a service descriptor table.

In more detail, FIG. 7 is a schematic diagram illustrating example implementation 700 of the hypervisor-assisted approach in FIG. 6 to locate a service descriptor table. At 710 in FIG. 7, guest OS 134B identifies a guest virtual memory address range (i.e., target address range) associated with the target. OS structure within guest virtual memory address space 2106 (e.g., $VB_1$ to $VB_N$). Similar to the example in FIG. 4, the target address range is associated with kernel image NTOSKRNL.EXE storing the service descriptor tables is identified.

At 720 and 730 in FIG. 7, guest OS 134B configures hypervisor 114 to perform a safe read on the target address range to access data stored within the target address range.

It should be understood that any suitable approach may be used to configure hypervisor 114 to perform "safe read" to access an arbitrary guest virtual memory address range without causing a crash at guest OS 134A/134B, such as when reading invalid or paged out locations, etc. One example approach is to register, with hypervisor 114, instruction pointer=SAFE_READ_INSTRUCTION_PTR to a memory copy function to cause hypervisor 114 to absorb any fault that arises from data access using the memory copy function.

In more detail, the memory copy function may be implemented in assembly language, such as "repz stosb" instruction using Intel (a trademark of Intel Corporation) as an example. A pre-requisite for the instruction is to fill in the register source index (RSI) to point to a source buffer, register destination index (RDI) to point a destination buffer, and the register C extended (RCX) register to hold the number of bytes to copy. The instruction results in copying RCX bytes from memory pointed by RSI to memory pointed by RDI. At end of the instruction, the RCX drops down to zero if the copy is successful.

When locating a particular OS data structure, the memory copy function may then be called for performing safe read on a target address range. If the location points to an invalid/paged out location, the page fault is first delivered to hypervisor 114, which figures that the page fault is happening from the registered instruction pointer=SAFE_READ_INSTRUCTION_PTR. In this case, hypervisor 114 absorbs the fault and sets the instruction pointer to the next instruction. The next instruction checks the contents of RCX register to determine whether the copy has succeeded or failed. If RCX is zero, the copy has succeeded. Otherwise, it has failed. Note that safe read 430/530/830 in FIG. 4, FIG. 5 and FIG. 8 may be implemented in a similar manner.

At 740 in FIG. 7, guest OS 134B obtains attribute data associated with the OS data structure. In practice, service descriptor tables KeServiceDescriptorTable, KeServiceDescriptorTableShadow and KeServiceDescriptorTableFilter within NTOSKRNL.EXE each include the following fields or table entries in order of: (A1) a pointer to a system call table, (A2) a pointer to a system call counters table (e.g., NULL in release builds), (A3) number of services, and (A4) a pointer to an argument table.

At 750 and 760 in FIG. 7, guest OS 134B performs attribute matching by comparing the data stored within the target address range with the attribute data, and determines a location of the target table based on the comparison. In particular, to locate a particular service descriptor table, a series of data stored on each guest physical memory page may be matched with respective attributes according to the predetermined order of (A1) to (A4).

In relation to (A1), guest OS 134B may determine whether there is a first data field storing a pointer to an address within the address space of NTOSKRNL.EXE. In relation to (A2), guest OS 134B may determine whether there is a subsequent second data field that is set to NULL (e.g., for release builds). Further, in relation to (A3), guest OS 134B may determine whether there is a subsequent third data field storing a legitimate number of services (e.g., less than 0x1000). In relation to (A4), guest OS 134B may determine whether there is a fourth data field storing a pointer to another address within the address space of NTOSKRNL.EXE.

Once the consecutive pattern is found (i.e., attributes A1 to A4 are matched in that order), the offset within the NTOSKRNL.EXE at which the target table is found is the location of the target table. Since KeServiceDescriptorTable, KeServiceDescriptorTableShadow and KeServiceDescriptorTableFilter stored in a particular order within NTOSKRNL.EXE, guest OS 134B may repeat the attribute matching process to identify three consecutive sets of data fields matching the above attributes.

Otherwise, if the consecutive pattern cannot be found once all the guest physical memory pages are searched, it is likely that the OS data structure has not been located. In this case, the notification approach may be used instead.

(b) Second Example: Processor-Related OS Data Structures

In a second example of the attribute matching approach, the OS data structure may be processor-related, such as a data structure (i.e., substructure) within Processor Control Range (PCR), Processor Control Block (PRCB), etc. An example will be discussed using FIG. 8, which is a schematic diagram illustrating example implementation 800 of the second hypervisor-assisted approach in FIG. 6 to locate a data structure within a processor-related data structure.

In practice, guest OS 134A/134B uses PCR to store processor-specific data, such as the processor's interrupt dispatch table, interrupt controller state, etc. The PRCB is maintained for each processor to store pointers to system data structures as well as information to configure the processor at initialization. One field within PRCB is an array of pointers to a KINTERRUPT object (see 822 in FIG. 8), which is internally used by interrupt dispatching code. The array has 256 entries, some of which may be NULL. Since the PRCB is a private structure that is used only by the kernel code in NTOSKRNL.EXE, the location of the array of pointers that each point to the KINTERRUPT object within the PRCB is unknown and may be located using the attribute matching approach.

Figure 8:
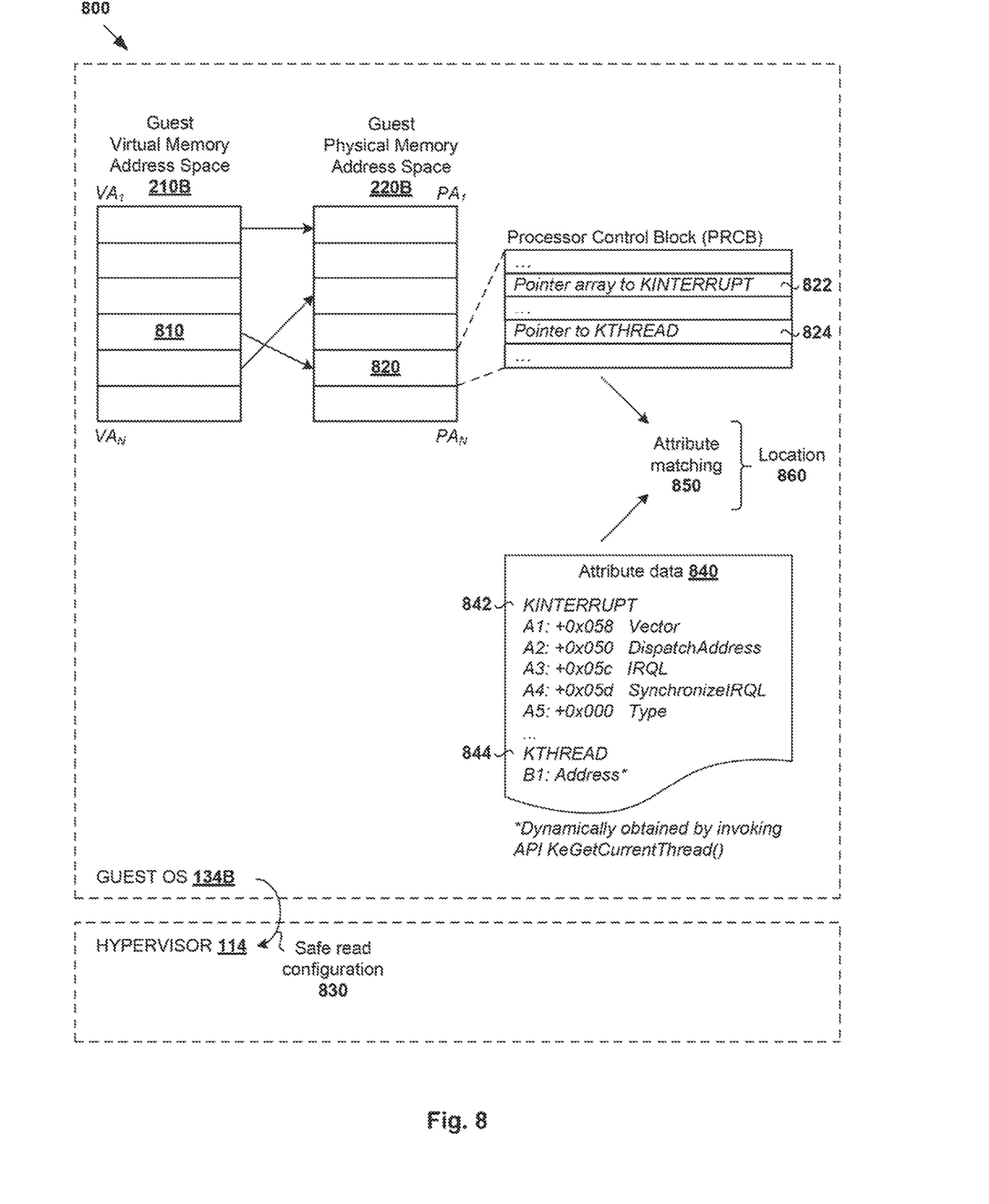
FIG. 8 is a schematic diagram illustrating an example implementation of the second hypervisor-assisted approach in FIG. 6 to locate a data structure within a processor-related data structure.

At 810 in FIG. 8, guest OS 134B identifies a target address range associated with the PRCB within a guest virtual memory address space 210B (e.g., $VB_1$ to $VB_N$).

At 820 and 830 in FIG. 8, guest OS 134B configures hypervisor 114 to perform a safe read to access data stored within the target address range. Examples discussed using safe read configuration 730 in FIG. 7 are also applicable here.

At 840 in FIG. 8, guest OS 134B obtains attribute data associated with the KINTERRUPT object within the PCRB. For example, inside the KINTERRUPT object, the offset data and data type associated with some fields are known, such as (A1) vector with offset=0x058 and data type=Uint4B; (A2) dispatchAddress with offset=0x050 and data type=Ptr64; (A3) IRQL with offset=0x05c and data type=UChar; (A4) synchronizeIRQL with offset=0x05d and data type=UChar; and (A5) Type with offset=0x000 and data type=Int2B. In practice, interrupt request levels (IRQLs) are used to implement an interrupt priority scheme to synchronize access to kernel-mode data structures. The kernel represents IRQLs internally as a number, such as between 0 and 31 on a 32-bit system, 0 and 15 on a 64-bit system, etc.

At 850 and 860 in FIG. 8, guest OS 134B performs attribute matching by comparing the data stored within the target address range with the attribute data, and determines a location of the target KINTTERUPT object based on the attribute matching. In particular, guest OS 134B may examine each pointer within PRCB. For each pointer that is not NULL and points to an object, guest OS 134B determines whether the object is indeed the KINTERRUPT object by matching the fields in the object with attributes (A1) to (A4).

For example, in relation to (A1), guest OS 134B may determine whether the field at offset=0x058 points to an interrupt vector associated with the vector field. In relation to (A2), guest OS 134B may determine whether the field at offset=0x050 points to a function within the NTOSKRNL.EXE code section. In relation to (A3), guest OS 134B may determine whether the field at offset=0x05c has a value within a predetermined range, such as not exceeding a high-level value (e.g., HIGH_LEVEL=15 in 64-bit system, HIGH_LEVEL=31 in 32-bit system, etc.).

Similarly, in relation to (A4), guest OS 134B may determine whether the field at offset=0x05d has a value within a predetermined range, such as not exceeding HIGH_LEVEL, etc. In relation to (A5), guest OS 134B may determine whether the field at offset=0x000 is set to a predetermined value of type (e.g., 0x16). Once attributes A1 to A4 are matched, the offset within the PRCB object at which the KINTERRUPT object may be identified. A corresponding guest physical memory address and guest virtual memory address may be determined as the location of the KINTERRUPT object.

In practice, the attribute data of a target OS data may also be dynamically obtained, such as by invoking an API. For example, the PRCB in FIG. 8 also include a pointer to a KTHREAD kernel structure (see 824 in FIG. 8) of a thread that is currently running. To dynamically locate OS data structure=pointer to KTHREAD, guest OS 134A may invoke public Windows API KeGetCurrentThread( ) to return a pointer to the current KTHREAD. The value of the pointer (i.e., address of KTHREAD) is used as attribute that is matched against the PRCB range. In particular, assuming that the address of KTHREAD=x, the PRCB range may be searched to locate x. When there is a match, the offset at which x is located is the address of the current KTHREAD within the PRCB.

As can be seen from the examples in FIG. 1 to FIG. 8, the hypervisor-assisted approaches according examples of the present disclosure are "forward compatible" as far as possible and not limited to a particular version or service packed of the OS. For example, the guest virtual memory address range is dynamically identified at run time and mapped to corresponding guest physical memory pages. The offset associated with the OS data structure is also dynamically identified or discovered.

Computer System

Figure 9:
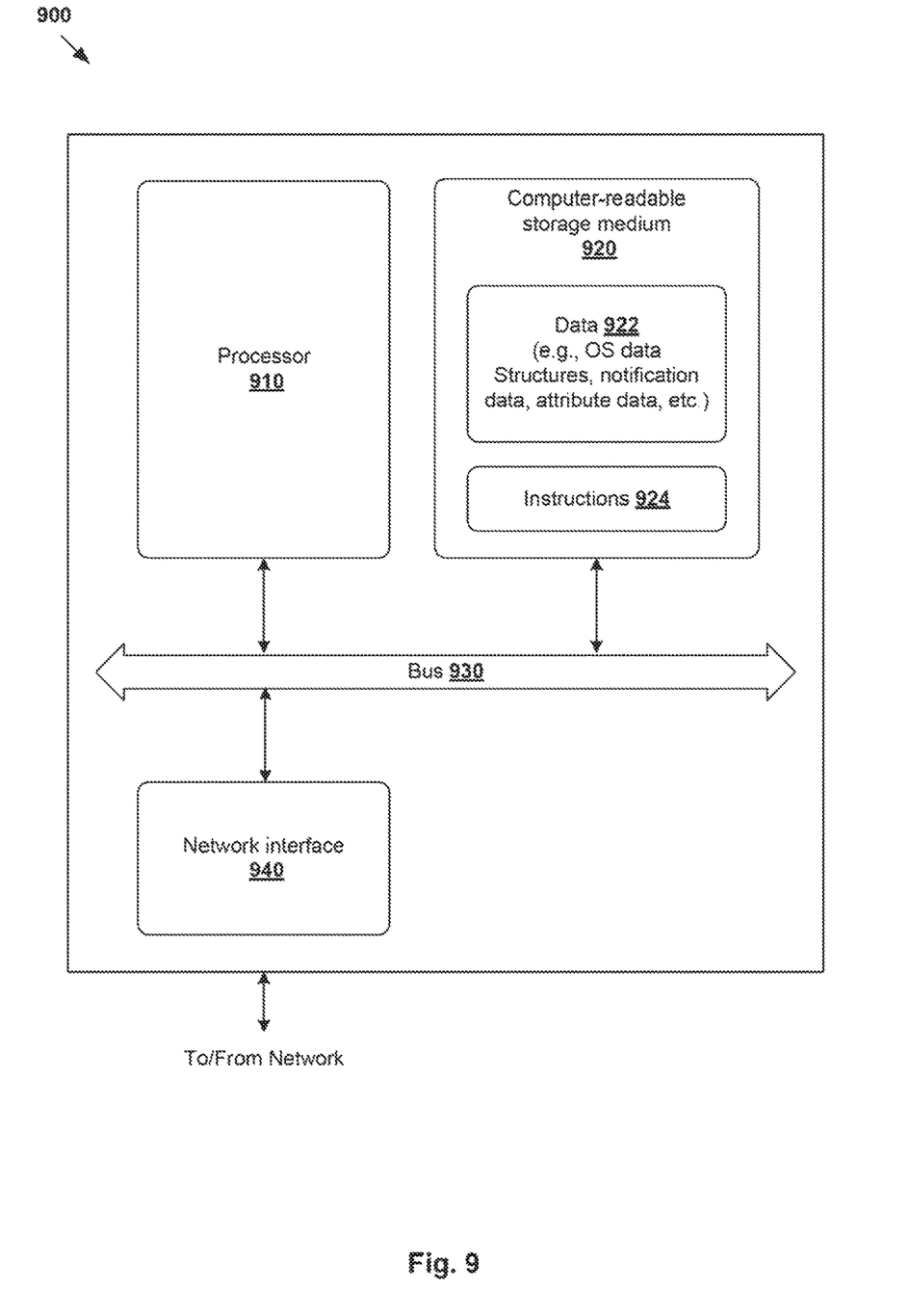
FIG. 9 is a schematic diagram illustrating an example computing system to locate an OS data structure on a host according to a hypervisor-assisted approach.

The above examples can be implemented by hardware (including hardware logic circuitry), software or firmware or a combination thereof. FIG. 9 is a schematic diagram illustrating example computing system 900 acting as host 110. Example computing system 900 may include processor 910, computer-readable storage medium 920, network interface 940, and bus 930 that facilitates communication among these illustrated components and other components.

Processor 910 is to perform processes described herein with reference to the drawings. Computer-readable storage medium 920 may store any suitable data 922, such as data relating to OS data structures, etc. Computer-readable storage medium 920 may further store computer-readable instructions 924 ("program code") that, in response to execution by processor 910, cause processor 910 to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method to locate an operating system (OS) data structure on a host according to a hypervisor-assisted approach, wherein the host supports a hypervisor and a virtualized computing instance, and the method comprises:
   identifying, by the virtualized computing instance, a guest virtual memory address range in which the OS data structure is stored, wherein the guest virtual memory address range is within a guest virtual memory address space of the virtualized computing instance;
   configuring, by the virtualized computing instance, the hypervisor to perform a safe read on the guest virtual memory address range to access data stored within the guest virtual memory address range;
   performing, by the virtualized computing instance, attribute matching by
   obtaining attribute data that specifies a predetermined order of multiple attributes associated with the OS data structure,
   matching a series of data stored on a particular guest physical memory page with the respective multiple attributes according to the predetermined order, and
   comparing the data stored within the guest virtual memory address range with the attribute data associated with the OS data structure; and
   determining, by the virtualized computing instance, a location associated with the OS data structure based on the attribute matching.

2. The method of claim 1, wherein performing the attribute matching comprises:
   obtaining the attribute data that includes one or more of the following attributes: memory page offset data associated with at least one field of the OS data structure, a value stored in at least one field of the OS data structure, data type associated with at least one field of the OS data structure; and
   matching the data stored on a particular guest physical memory page with the one or more attributes.

3. The method of claim 1, wherein configuring the hypervisor comprises:
   registering, with the hypervisor, an instruction pointer to a memory copy function to cause the hypervisor to absorb any fault that arises from accessing the data stored within the guest virtual memory address range using the memory copy function.

4. The method of claim 3, wherein configuring the hypervisor comprises:
   calling the memory copy function to copy the data stored within the guest virtual memory address range from a source buffer to a destination buffer.

5. The method of claim 1, wherein determining the location comprises:
   based on the attribute matching, identifying a particular address or address range within the guest virtual memory address range that stores data matching with the attribute data.

6. The method of claim 1, wherein identifying the guest virtual memory address range comprises:
   identifying the guest virtual memory address range associated with a kernel image of a guest OS executing on the virtualized computing instance, wherein the OS data structure is stored within the kernel image.

7. A non-transitory computer-readable storage medium that includes a set of instructions which, in response to execution by a processor of a host, cause the processor to perform a method of locating an operating system (OS) data structure on a host according to a hypervisor-assisted approach, wherein the host supports a hypervisor and a virtualized computing instance, and the method comprises:
   identifying, by the virtualized computing instance, a guest virtual memory address range in which the OS data structure is stored, wherein the guest virtual memory address range is within a guest virtual memory address space of the virtualized computing instance;
   configuring, by the virtualized computing instance, the hypervisor to perform a safe read on the guest virtual memory address range to access data stored within the guest virtual memory address range;
   performing, by the virtualized computing instance, attribute matching by
   obtaining attribute data that specifies a predetermined order of multiple attributes associated with the OS data structure,
   matching a series of data stored on a particular guest physical memory page with the respective multiple attributes according to the predetermined order, and
   comparing the data stored within the guest virtual memory address range with the attribute data associated with the OS data structure; and
   determining, by the virtualized computing instance, a location associated with the OS data structure based on the attribute matching.

8. The non-transitory computer-readable storage medium of claim 7, wherein performing the attribute matching comprises:
   obtaining the attribute data that includes one or more of the following attributes: memory page offset data associated with at least one field of the OS data structure, a value stored in at least one field of the OS data structure, data type associated with at least one field of the OS data structure; and matching the data stored on a particular guest physical memory page with the one or more attributes.

9. The non-transitory computer-readable storage medium of claim 7, wherein configuring the hypervisor comprises:

registering, with the hypervisor, an instruction pointer to a memory copy function to cause the hypervisor to absorb any fault that arises from accessing the data stored within the guest virtual memory address range using the memory copy function.

10. The non-transitory computer-readable storage medium of claim 9, wherein configuring the hypervisor comprises:

calling the memory copy function to copy the data stored within the guest virtual memory address range from a source buffer to a destination buffer.

11. The non-transitory computer-readable storage medium of claim 7, wherein determining the location comprises:

based on the attribute matching, identifying a particular address or address range within the guest virtual memory address range that stores data matching with the attribute data.

12. The non-transitory computer-readable storage medium of claim 7, wherein identifying the guest virtual memory address range comprises:

identifying the guest virtual memory address range associated with a kernel image of a guest OS, wherein the OS data structure is stored within the kernel image.

13. A computer system, comprising:

a processor; and a non-transitory computer-readable medium having stored thereon instructions that, when executed by the processor, cause the processor to support a hypervisor and a virtualized computing instance, and to perform the following:

identify, by the virtualized computing instance, a guest virtual memory address range in which the OS data structure is stored, wherein the guest virtual memory address range is within a guest virtual memory address space of the virtualized computing instance;

configure, by the virtualized computing instance, the hypervisor to perform a safe read on the guest virtual memory address range to access data stored within the guest virtual memory address range;

perform, by the virtualized computing instance, attribute matching by obtaining attribute data that specifies a predetermined order of multiple attributes associated with the OS data structure, matching a series of data stored on a particular guest physical memory page with the respective multiple attributes according to the predetermined order, and comparing the data stored within the guest virtual memory address range with the attribute data associated with the OS data structure; and determine, by the virtualized computing instance, a location associated with the OS data structure based on the attribute matching.

14. The computer system of claim 13, wherein the instructions for performing the attribute matching cause the processor to:

obtain the attribute data that includes one or more of the following attributes: memory page offset data associated with at least one field of the OS data structure, a value stored in at least one field of the OS data structure, data type associated with at least one field of the OS data structure; and match the data stored on a particular guest physical memory page with the one or more attributes.

15. The computer system of claim 13, wherein the instructions for configuring the hypervisor cause the processor to:

register, with the hypervisor, an instruction pointer to a memory copy function to cause the hypervisor to absorb any fault that arises from accessing the data stored within the guest virtual memory address range using the memory copy function.

16. The computer system of claim 15, wherein the instructions for configuring the hypervisor cause the processor to:

call the memory copy function to copy the data stored within the guest virtual memory address range from a source buffer to a destination buffer.

17. The computer system of claim 13, wherein the instructions for determining the location cause the processor to:

based on the attribute matching, identifying a particular address or address range within the guest virtual memory address range that stores data matching with the attribute data.

18. The computer system of claim 13, wherein the instructions for identifying the guest virtual memory address range cause the processor to:

identify the guest virtual memory address range associated with a kernel image of a guest OS executing on the virtualized computing instance, wherein the OS data structure is stored within the kernel image.

* * * * *